(12) United States Patent
Ganon et al.

(10) Patent No.: US 11,294,832 B2
(45) Date of Patent: Apr. 5, 2022

(54) SYSTEMS AND METHODS FOR QUEUING DEVICE MANAGEMENT CONFIGURATION REQUESTS

(71) Applicant: Western Digital Technologies, Inc., San Jose, CA (US)

(72) Inventors: Doron Ganon, San Jose, CA (US); Edris Abzakh, San Jose, CA (US); Tomer Spector, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/825,762

(22) Filed: Mar. 20, 2020

(65) Prior Publication Data

US 2021/0294758 A1 Sep. 23, 2021

(51) Int. Cl.
*G06F 13/16* (2006.01)
*G06F 3/06* (2006.01)

(52) U.S. Cl.
CPC ...... *G06F 13/1642* (2013.01); *G06F 13/1668* (2013.01); *G06F 3/0659* (2013.01)

(58) Field of Classification Search
CPC .......................... G06F 13/1642; G06F 13/1668
USPC .......................................................... 710/5
See application file for complete search history.

(56) References Cited

U.S. PATENT DOCUMENTS

| | | | |
|---|---|---|---|
| 6,915,354 B1 | 7/2005 | Ozdemir et al. | |
| 10,084,683 B2 | 9/2018 | Hsu et al. | |
| 10,185,516 B2 * | 1/2019 | Um | G06F 3/0679 |
| 10,445,016 B2 * | 10/2019 | Authement | G06F 3/0679 |
| 10,635,317 B2 * | 4/2020 | Kim | G06F 13/1663 |
| 2013/0097460 A1 | 4/2013 | Jeong et al. | |
| 2017/0123656 A1 * | 5/2017 | Benisty | G06F 3/0688 |
| 2017/0249081 A1 * | 8/2017 | Tzori | G06F 3/0688 |
| 2020/0174865 A1 * | 6/2020 | Kim | G06F 13/1668 |

FOREIGN PATENT DOCUMENTS

WO    2010063308 A1    6/2010

OTHER PUBLICATIONS

Configuring a Port Channel Interface, CCNA Workbook, Sep. 20, 2019, https://www.freeccnaworkbook.com/workbooks/ccna/configuring-a-port-channel-interface.

* cited by examiner

*Primary Examiner* — Brian T Misiura
(74) *Attorney, Agent, or Firm* — Dickinson Wright PLLC; Steven Hurles

(57) ABSTRACT

A method for executing device management commands includes providing a device management command queue indication. The method also includes receiving, from a host in response to providing the device management command queue indication, device management commands and a respective command type for each device management command. The method also includes determining a command execution order for the device management commands based on the command types corresponding to respective device management commands and queueing, in a device management command queue, the device management commands based on the command execution order. The method also includes executing the device management commands according to the device management command queue. The method also includes communicating, to the host, a command execution indication responsive to executing the device management commands.

20 Claims, 4 Drawing Sheets

SYSTEMS AND METHODS FOR QUEUING DEVICE MANAGEMENT CONFIGURATION REQUESTS

TECHNICAL FIELD

This disclosure relates to memory systems and in particular to systems and methods for queuing device management configuration requests on a memory system.

BACKGROUND

Non-volatile memory systems are a type of memory that retains stored information without requiring an external power source. Non-volatile memory systems include a controller coupled to one or more memory arrays. Non-volatile memory is widely used in various electronic devices and in stand-alone memory devices. For example, non-volatile memory can be found in laptops, digital audio players, digital cameras, smart phones, scientific instruments, industrial robots, medical electronics, IOT (Internet of Things) devices, solid-state drives, USB drives, memory cards, and the like.

A memory system is connected to and in communication with a host system. The host system (or "host") typically is responsible for configuring the memory system, sending data to the memory system, and reading data from the memory system. The host may provide instructions to the controller to perform various operations on memory cells of the memory system (e.g., program operations, read operations, erase operations, and the like). Communications between the host and the controller are typically defined by a standard. For example, the communications between the host and the controller may be defined by the Universal Protocol (UniPro) specification (SPEC) for Universal Flash Storage (UFS) standard or other suitable standard. The standard may define how the host uses various layers to communicate to corresponding layers of the controller.

In addition to providing instructions to the controller, the host may also provide configuration requests for configuring channels of the memory system. The configuration requests may be referred to as device management commands. The UniPro SPEC (e.g., including link layer of UFS products) defines a process to configure a channel of the memory system by completing one device management command to change one attribute at a time. For example, the host sets or the controller receives one attribute (e.g., corresponding to one device management command). The controller then performs the device management command to set the attribute. After a period of time expires, the host determines, such as by requesting status from the controller, whether the controller successfully set the attribute. This occurs before the host moves to the next device management command. That is, the host waits for the completion of one command before continuing to the next command. Typically, such a process is executed by upper layers of the memory system (e.g., application through Host Controller) and may be relatively time consuming, especially if a number of attributes need to be configured. Accordingly, it would be beneficial to reduce configuration latency.

SUMMARY

An aspect of the disclosed embodiments includes a method for executing device management commands. The method includes providing a device management command queue indication. The method also includes receiving, from a host in response to providing the device management command queue indication, device management commands, and a respective command type for each device management command. The method also includes determining a command execution order for the device management commands based on the command types corresponding to respective device management commands. The method also includes queueing, in a device management command queue, the device management commands based on the command execution order. The method also includes executing the device management commands according to the device management command queue. The method also includes communicating, to the host, a command execution indication responsive to executing the device management commands.

Another aspect of the disclosed embodiments includes a controller. The controller includes a bus interface and a processor. The bus interface is in communication with a host device. The processor is configured to: receive, from the host device; device management commands and a respective command type for each device management command; determine a command execution order for the device management commands based on the command types corresponding to respective device management commands; queue, in a device management command queue, the device management commands based on the command execution order; execute the device management commands according to the device management command queue; and communicate, to the host device, a command execution indication responsive to executing the device management commands.

Another aspect of the disclosed embodiments includes a system for executing device management commands. The system includes a processor and a memory. The memory includes instructions that, when executed by the processor, cause the processor to: receive, from an initiator device; at least one device management command and a command type corresponding to the at least one device management command; determine a queue position for the at least one device management command based on the command type corresponding to the at least one device management command and command types corresponding to other device management commands in a device management command queue; queue, in the device management command queue, the at least one device management command based on the queue position; execute the at least one device management command and the other device management commands according to the device management command queue; and communicate, to the initiator device, a command execution indication responsive to executing the at least one device management command.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
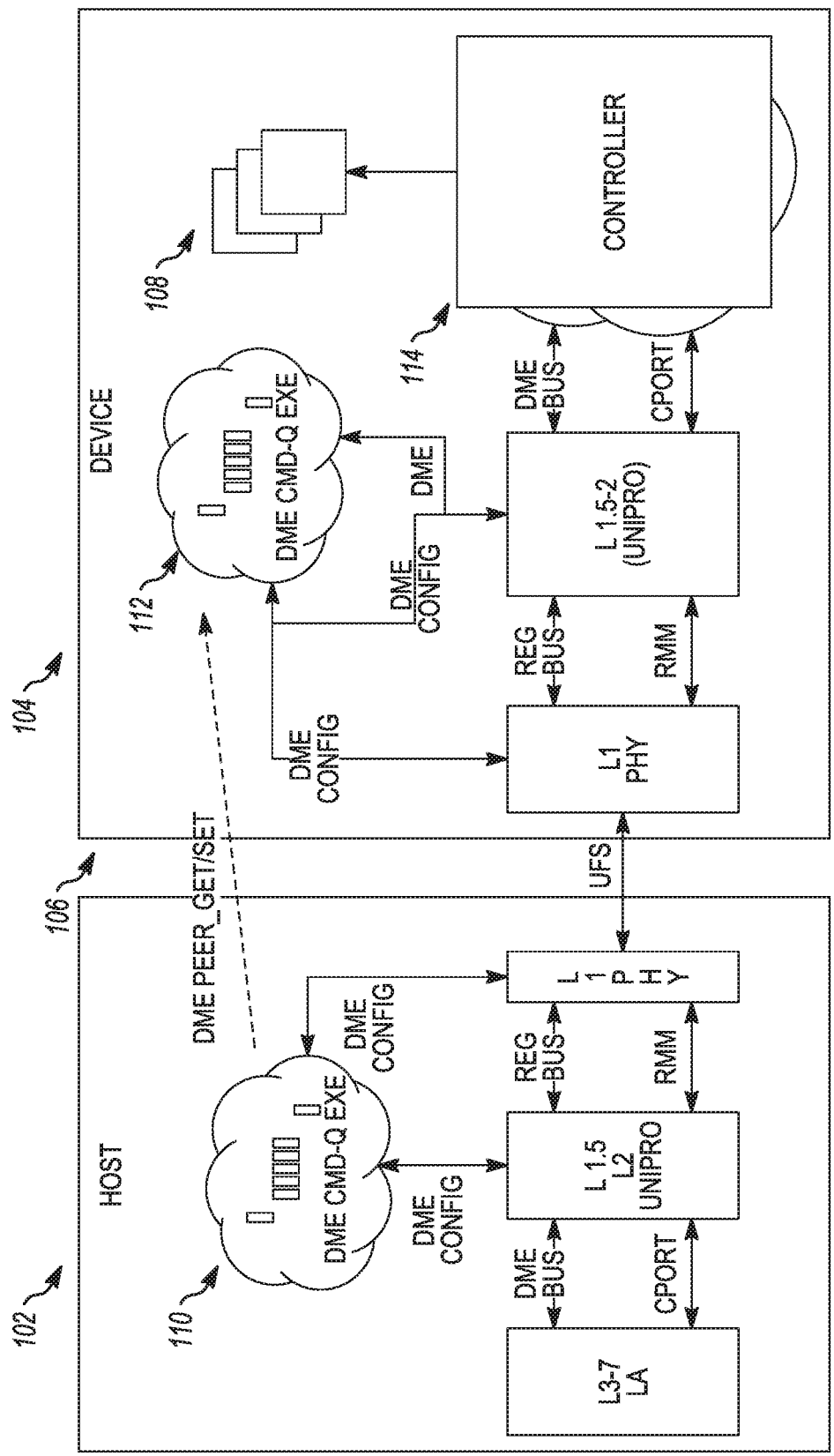
FIG. 1 is a schematic block diagram illustrating communication between a host and a memory system according to the principles of the present technology.

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The present disclosure is directed to systems and methods for configuring a memory system by a host system. In one embodiment, the memory system may be configured to release the host from handling a sequential series of device management commands to implement current UFS/MIPI SPEC flows (e.g., and potentially future ones). Additionally, or alternatively, the systems and methods described herein may be configured to reduce overhead while setting attributes of the memory system as all device management commands are queued and executed without having to monitor individual device management command execution progress.

Conventional memory systems are limited to sending and completing one device management command serially. In one embodiment, the present disclosure provides a memory system that processes a burst of device management commands and configures a plurality of parameters of the memory system concurrently.

Accordingly, systems and methods, such as those described herein, that allow the host to queue device management commands (e.g., configuration requests), may be desirable. In some embodiments, the systems and methods described herein may be configured to provide two modes of device management command queuing. For example, the systems and methods described herein may be configured to queue device management commands (e.g., configuration requests). The systems and methods may be configured to execute each device management command. The systems and methods may be configured to, in response to completing execution of each device management command, generate a status indication. The status indication may indicate whether the device management command was successfully executed. The systems and methods may be configured to determine the status of each of the device management commands in the queue based on the status indication. The systems and methods may be configured to correlate each status indication with a corresponding device management command.

In some embodiments, the systems and methods described herein may be configured to queue the device management commands by communicating a plurality (e.g., a burst) of device management commands to the controller one after another without waiting for status of each one before proceeding to next one. The systems and methods may be configured to determine whether the controller (e.g., on a peer side) includes a device management entity command execution queue (DME-Q). The systems and methods may be configured to, in response to a determination that the controller includes a DME-Q, communicate a plurality of device management commands to the controller. The systems and methods may be configured to order, in the DME-Q, the device management commands. The systems and methods may be configured to execute the device management commands according to the queue.

The systems and methods described herein may be configured to generate a status indication indicating that all device management commands associated with the plurality of device management commands are complete (e.g., without reporting status after completion of each device management command). In some embodiments, the systems and methods may be configured to determine whether an error occurred during execution of at least one of the device management commands. The systems and methods may be configured to generate an error indication indicating an error occurred (e.g., during a first instance of the error) and communicate the error indication to the host.

In some embodiments, the systems and methods described herein may be configured to identify a command type for each device management command. For example, the host may communicate to the controller the plurality of device management commands and a command type for each of the plurality of device management commands. The controller may generate an order of execution for the plurality of device management commands based on the command type corresponding to each of the device management commands. In some embodiments, the systems and methods may be configured to queue the device management commands according to the order of execution. In some embodiments, the systems and methods may be configured to determine queue positions for each of the device management commands based on the respective command types.

In some embodiments, the command type may include a simple command type, an ordered command type, and a head-of-queue command type. Device management commands having a simple command type may be executed in any order among other device management commands having simple command types. Device management commands having an ordered command type may be executed only after all previous device management commands already in the DME-Q are executed and before device management commands subsequently added to the DME-Q. Device management commands having a head-of-queue command type may be executed as soon as possible (e.g., including bypassing other device management commands already in the DME-Q).

In some embodiments, the systems and methods described herein may be configured to provide a device management command queue indication. The systems and methods may be configured to receive, from a host in response to providing the device management command queue indication, device management commands and a respective command type for each device management command. The systems and methods may be configured to determine a command execution order for the device management commands based on the command types corresponding to respective device management commands. The systems and methods may be configured to queue, in a device management command queue, the device management commands based on the command execution order.

The systems and methods may be configured to executing the device management commands according to the device management command queue. The systems and methods may be configured to communicate, to the host, a command execution indication responsive to executing the device management commands.

Referring now to FIG. 1, a schematic block diagram of an example system 100 including a host device 102 in communication with a memory system 104 by way of a bus 106. Examples of the host 102 include computing devices such as a desktop computer, rack mounted server, a laptop, a smartphone, a tablet, or other suitable computing devices. The host 102 can also include systems and devices such as a gaming system, a digital phone, a digital camera, portable media player, IOT device, remote control, television stick, smart television, and the like. The memory system 104 can be implemented in a memory card such as secure digital (SD) card or a micro secure digital (micro-SD) card. In some embodiments, the memory system 104 is embedded in the host 102, for example as a solid-state disk (SSD) drive installed in a laptop computer.

The bus 106 allows communication of any known or after developed communication protocol that enables the host 102 to communicate with the memory system 104. The communication protocol may include Secure Digital (SD) protocol, Memory Stick (MS) protocol, USB protocol, Advanced Microcontroller Bus Architecture (AMBA), or other suitable protocols. In particular, the bus 106 may enable a bus interface that implements any known or after developed communication protocol, such as a serial advanced technology attachment (SATA) or peripheral component interface express (PCIe) interface.

The memory system 104 includes a non-volatile memory (NVM) block 108 connected to a controller 114. The NVM block 108 may include several memory die. In some embodiments, the NVM block 108 defines a physical set of memory die. In other embodiments, the NVM block 108 defines a logical set of memory die, where the NVM block 108 includes memory die from several physically different sets of memory die. The manner in which the NVM block 108 is defined is not meant to be limiting.

The controller 114 acts as an interface between the host 102 and the memory system 104 and manages data stored in the memory system 104. For example, the host 102 can access data stored in the memory system 104 by providing a logical address, via the bus interface associated with the bus 106, to the controller 114, which, the controller 114 converts to a physical address. The controller 114 can access data and/or a particular storage location associated with the physical address and facilitate transferring data between the host 102 and the memory system 104. In some embodiments, where the memory system 104 includes flash memory, the controller 114 formats the flash memory to ensure the memory is operating properly, maps out bad flash memory cells, and allocates spare cells to be substituted for future failed cells or used to hold firmware to operate the flash memory controller.

In some embodiments, communications between the host 102 and the memory system 104 may be defined by the Universal Protocol (UniPro) specification (SPEC) for Universal Flash Storage (UFS) standard. As is generally illustrated in FIG. 1, the host 102 may communicate via various layers (e.g., LINKS) of the controller 114. The host 102 may communicate device management commands to the memory system controller 114 to set various attributes associated with the UniPro standard (e.g., to adapt new standards) or to set various attributions to change other characteristics of the memory system 104.

The host 102 may include a host device management entity queue (DME-Q) 110 and the controller 114 may include a controller DME-Q 112. The host DME-Q 110 and the controller DME-Q 112 allow the host 102 to queue device management commands and offload management of execution and status verification of the device management commands to the controller 114. In some embodiments, the host DME-Q 110 and the controller DME-Q 112 may be a component of the LINK (UNIPRO) or may be extended and out of the UniPro standard. The host DME-Q 110 and the controller DME-Q 112 are symmetrical (e.g., as UNIPRO/PHY are symmetric IPs on the host 102 and the controller 114). However, in some embodiments, the host DME-Q 110 and the controller DME-Q 112 may be asymmetric and supported by the controller 114 only or the host 102 only.

In some embodiments, the host 102 is configured to communicate device management commands (e.g., associated with configuration requests or operations, such as power mode change operations or other suitable operations) from the host DME-Q 110 to the controller DME-Q 112. In this regard, the host 102 may communicate device management commands to the controller 114 either serially (i.e., one configuration command sent after another sequentially without queuing) or as a burst of configuration commands (i.e., a plurality of configuration commands sent together). In the burst mode, the host 102 additionally sends the command types.

Figure 2:
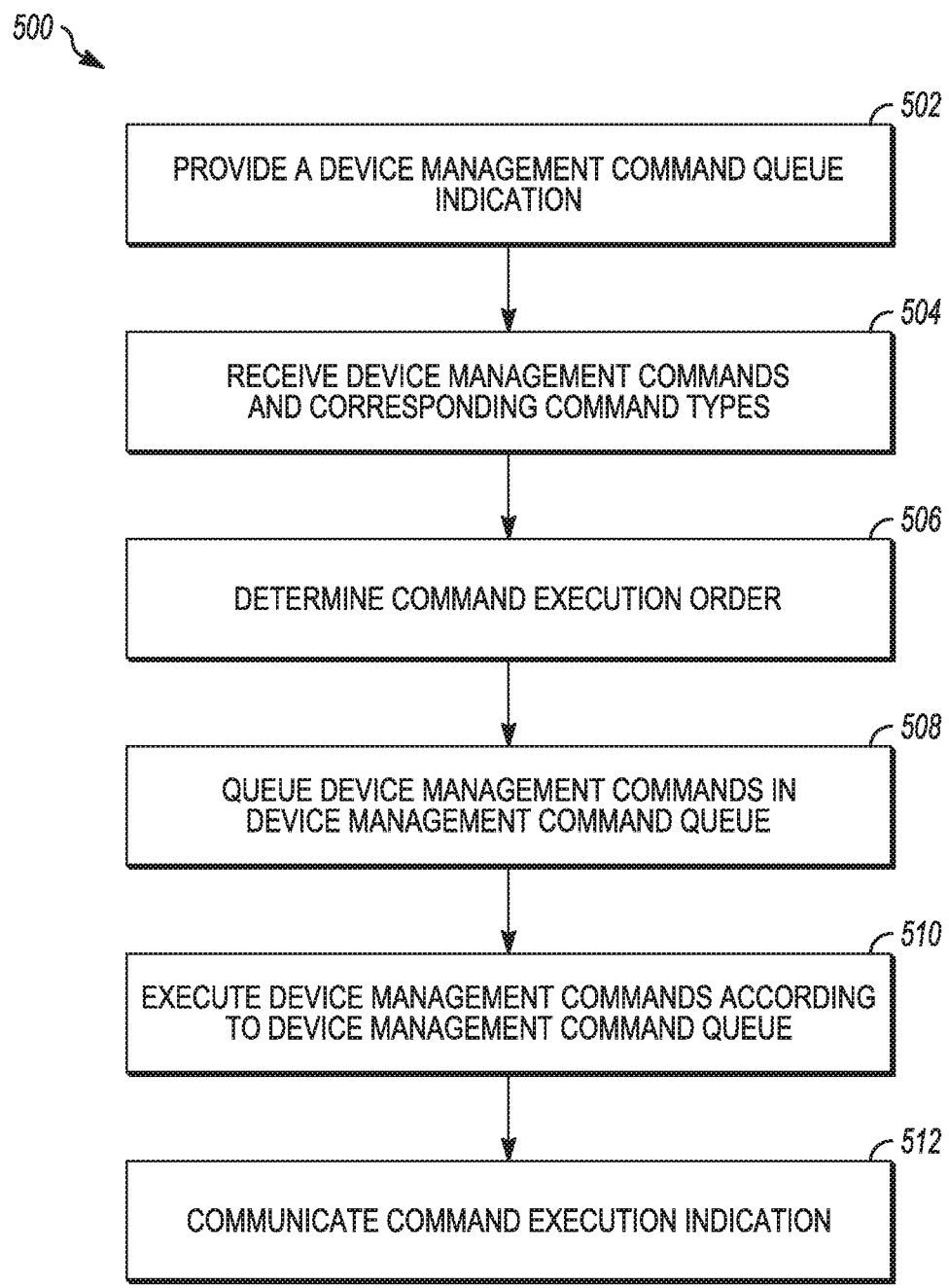
FIG. 2 is a flow diagram illustrating a device management command execution method according to the principles of the present technology.

FIG. 2 is a flow diagram illustrating a device management command execution method 500 according to the principles of the present disclosure. At 502, the method 500 provides a device management command queue indication. For example, the controller provides an indication to the host 102 indicating that the controller includes the controller DME-Q 112. At 504, the method 500 receives device management commands and corresponding command types. For example, the controller receives, from the host 102, one or more device management commands, as described. At 506, the method 500 determines a command execution order. For example, the controller determines the command execution order based on the command types.

At 508, the method 500 queues the device management commands in a device management command queue. For example, the controller determines queue positions in the controller DME-Q 112 for the device management commands according to the command execution order and/or other device management commands already in the controller DME-Q 112. At 510, the method 500 executes the device management commands according to the device management command queue. For example, the controller executes the device management commands according to the order in the controller DME-Q 112. At 512, the method 500 communicates a command execution indication. For example, the controller stores the result of the configuration. The controller, in response to a request from the host 102 to provide a status of the configuration, generates a command execution indication corresponding to the result of the configuration and communicates, to the host 102, the status indication and/or the error indication (e.g., based on a determination that an error occurred).

Figure 3:
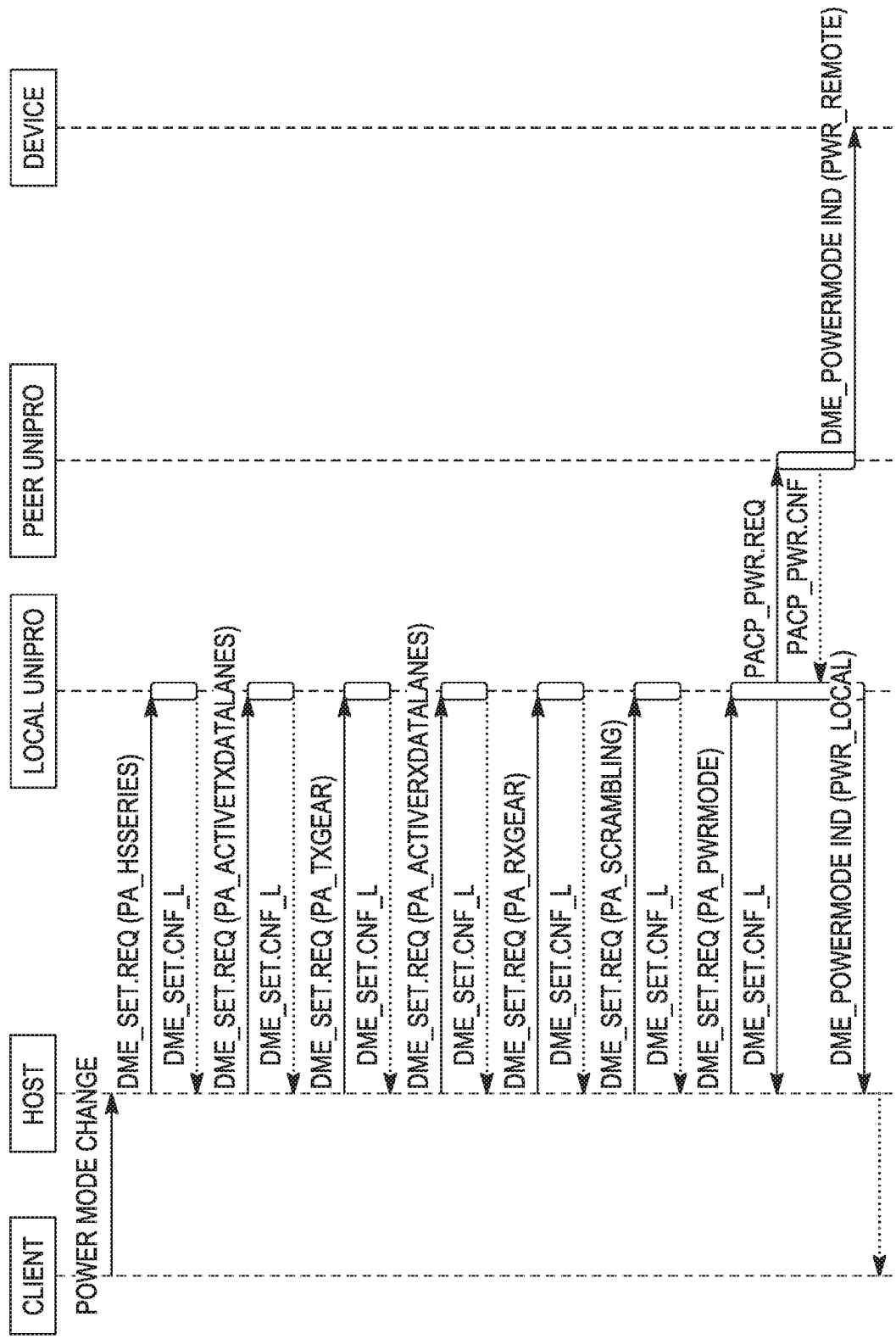
FIG. 3 is a flow diagram generally illustrating a device management command execution workflow (Power-Mode-Change flow in this example) permitted by the present technology.
Figure 4:
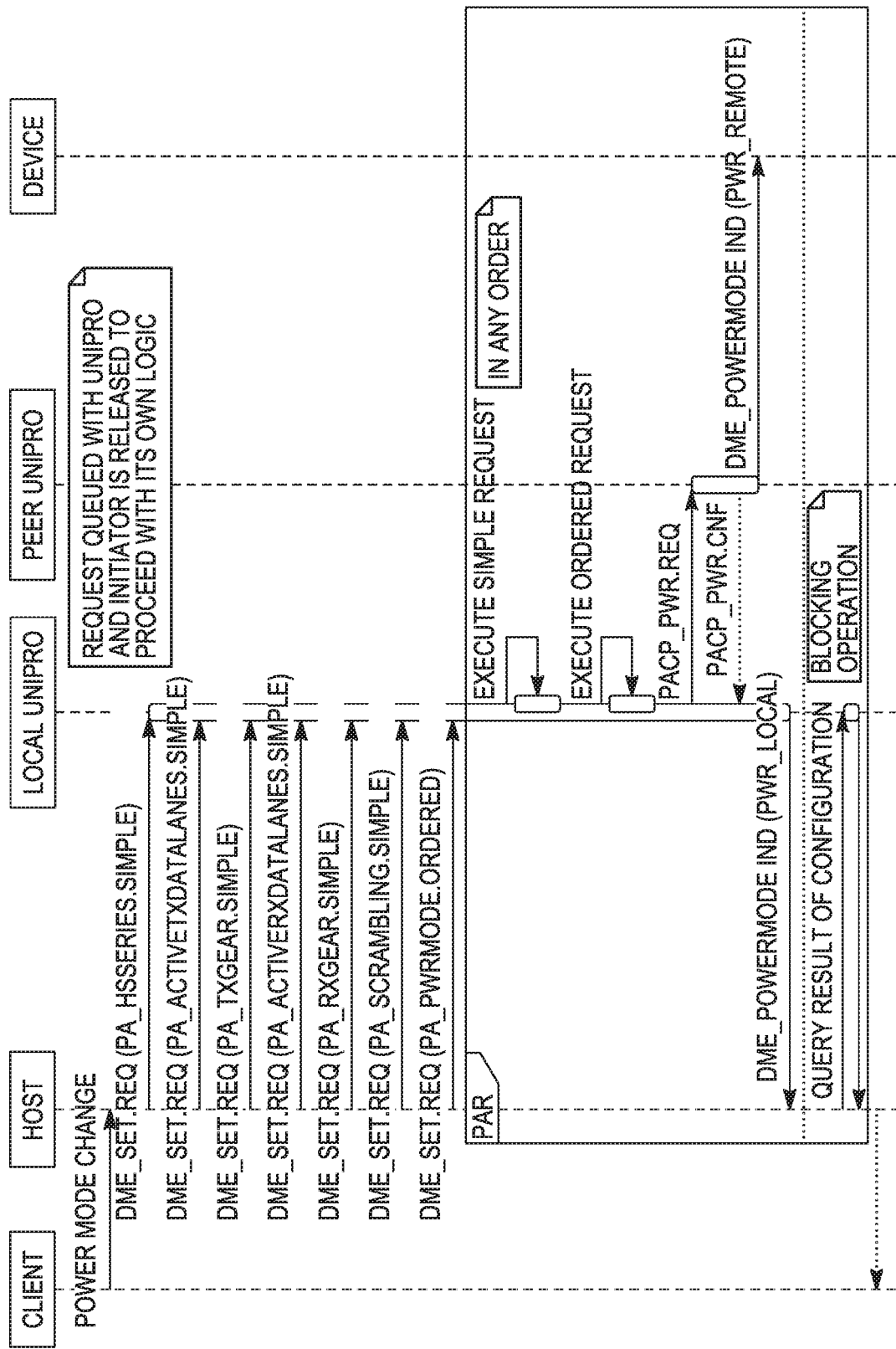
FIG. 4 is a flow diagram generally illustrating a device management command execution workflow (Power-Mode-Change flow in this example) according to the principles of the present technology.

As is generally illustrated in FIGS. 3 and 4, a client may request a power mode change. A host, such as the host 102, may receive the power mode change request and communicate, using a local communication channel, such as a local UniPro channel or other suitable channel, device manage commands associated with the power mode change. The local communication channel (e.g., local UniPro) may communicate the device management commands and command types to a peer communication change, such as a peer UniPro channel or other suitable channel on a device, such as a storage system and/or the controller 114. The controller 114, as will be described, may execute the entire batch of device management commands associated with the power management command before communicating a status to the host 102.

The controller 114 may determine command execution order for the device management commands based on the command types. For example, if the controller 114 receives the device management commands serially, the controller 114 determines the command execution order is the same as the order in which the device management commands are received. If the controller 114 receives a plurality of device management commands as a burst (while taking advantage of DME-Q), the controller 114 generates the command execution order based on the command type. The command type may include a simple command type, an ordered command type, and a head-of-queue command type, as described.

The controller 114 may execute the device management commands according to the order in the controller DME-Q 112. If the controller 114 serially received the device management commands, the controller 114 may generate a status (e.g., or an execution) indication during and/or after completion of a corresponding device management command. The controller 114 may communicate the status indication to the host 102 after the controller 114 completes execution of an entire batch of the device management commands. For example, the controller 114 may execute a power mode change operation and executed all device management commands before communicating a status to the host 102 (e.g., the controller 114 does not communicate a status for each device management command execution but instead communicates the entire power mode change operation before communicating the status to the host 102). It should be understood that power mode change operation is one example and the controller 114 may execute any suitable device management commands in batch for an entire operation.

If the controller 114 received a plurality of device management commands as a burst, the controller 114 may wait until completion of all of the device management commands associated with the plurality of device management commands to generate the status indication. The controller 114 may communicate the status indication to the host 102 in response to the controller 114 completing execution of the plurality of device management commands. Additionally, or alternatively, the controller 114 may store the result of the execution of the plurality of device management commands. The controller 114, in response to a request from the host, may generate a status indicator corresponding to the result of the execution of the plurality of device management commands and may communicate the status indication to the host.

In some embodiments, the controller 114 may be configured to determine whether an error occurred while executing a respective device management command. If the controller 114 determines an error occurred, the controller 114 may generate an error indication and communicate the error indication to the host 102 (e.g., the controller 114 does not wait until completion of other device management commands before communicating the error indication). Additionally, or alternatively, the controller 114 may store the error indication and may communicate the error indication to the host in response to a request from the host to communicate a status. The host 102 may receive various status indications and proceed accordingly. Additionally, or alternatively, the host 102 may receive an error indication and determine whether to instruct the controller 114 to take corrective action.

In some embodiments, the controller 114 may perform the methods described herein. However, the methods described herein as performed by the controller 114 are not meant to be limiting, and any type of software executed on a controller 114 can perform the methods described herein without departing from the scope of this disclosure. For example, a controller such as a processor executing software within the host 102 or firmware within the memory system 104 can perform the methods described herein.

In some embodiments, a method for executing device management commands includes providing a device management command queue indication. The method also includes receiving, from a host in response to providing the device management command queue indication, device management commands, and a respective command type for each device management command. The method also includes determining a command execution order for the device management commands based on the command types corresponding to respective device management commands. The method also includes queueing, in a device management command queue, the device management commands based on the command execution order. The method also includes executing the device management commands according to the device management command queue. The method also includes communicating, in response to a request from the host, a command execution indication responsive to executing the device management commands to the host.

In some embodiments, the respective command type of at least one of the device management commands includes a simple command type. In some embodiments, the respective command type of at least one of the device management commands includes an ordered command type. In some embodiments, determining the command execution order for the device management commands based on the command types corresponding to respective device management commands includes ordering all device management commands having the ordered command type to be executed after all previously queued device management commands and before all subsequently queued device management commands. In some embodiments, the respective command type of at least one of the device management commands includes a head-of-queue command type. In some embodiments, determining the command execution order for the device management commands based on the command types corresponding to respective device management commands includes ordering all device management commands having the head-of-queue command type to be executed before all previously queued device management commands. In some embodiments, communicating, to the host, the command execution indication responsive to executing the device management commands includes communicating, to the host, the command execution indication after executing each of the device management commands. In some embodiments, communicating, to the host, the command execution indication responsive to executing the device management commands includes communicating, to the host, the command execution indication after executing all of the device management commands.

In some embodiments, a controller includes a bus interface and a processor. The bus interface is in communication with a host device. The processor is configured to: receive, from the host device; device management commands and a respective command type for each device management command; determine a command execution order for the device management commands based on the command types corresponding to respective device management commands; queue, in a device management command queue, the device management commands based on the command execution order; execute the device management commands according to the device management command queue; and communicate, to the host device, a command execution indication responsive to executing the device management commands.

In some embodiments, the respective command type of at least one of the device management commands includes a simple command type. In some embodiments, the respective command type of at least one of the device management commands includes an ordered command type. In some embodiments, the processor is further configured to determine the command execution order for the device management commands based on the command types corresponding to respective device management commands by ordering all device management commands having the ordered command type to be executed after all previously queued device management commands and before all subsequently queued device management commands. In some embodiments, the respective command type of at least one of the device management commands includes a head-of-queue command type. In some embodiments, the processor is further configured to determine the command execution order for the device management commands based on the command types corresponding to respective device management commands by ordering all device management commands having the head-of-queue command type to be executed before all previously queued device management commands. In some embodiments, the processor is further configured to communicate, to the host device, the command execution indication after executing each of the device management commands. In some embodiments, the processor is further configured to communicate, to the host device, the command execution indication after executing all of the device management commands.

In some embodiments, a system for executing device management commands includes a processor and a memory. The memory includes instructions that, when executed by the processor, cause the processor to: receive, from an initiator device; at least one device management command and a command type corresponding to the at least one device management command; determine a queue position for the at least one device management command based on the command type corresponding to the at least one device management command and command types corresponding to other device management commands in a device management command queue; queue, in the device management command queue, the at least one device management command based on the queue position; execute the at least one device management command and the other device management commands according to the device management command queue; and communicate, to the initiator device, a command execution indication responsive to executing the at least one device management command.

In some embodiments, the command type corresponding to the at least one device management command includes a first command type, and wherein the queue position of the at least one device management command includes a position in the device management command queue immediately before or after any device management command of the other device management commands in the device management command queue having the first command type. In some embodiments, the command type corresponding to the at least one device management command includes a second command type, and wherein the queue position of the at least one device management command includes a first available position in the device management command queue. In some embodiments, the command type corresponding to the at least one device management command includes a third command type, and wherein the queue position of the at least one device management command includes a first position in the device management command queue.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications. In the preceding description and in the claims, the terms "including" and "comprising" are used in an open-ended fashion, and thus should be interpreted to mean "including, but not limited to . . . ." In addition, the term "couple" or "couples" is intended to mean either an indirect or a direct connection. Thus, if a first device couples to a second device, that connection may be through a direct connection or through an indirect connection via other devices and connections.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module. In some embodiments, the controller is implemented within the host 102 can be configured with hardware and/or firmware to perform the various functions described herein.

"Controller" shall mean individual circuit components, an application-specific integrated circuit (ASIC), a microcontroller with controlling software, a digital signal processor (DSP), a processor with controlling software, a field programmable gate array (FPGA), or combinations thereof.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

The invention claimed is:

1. A method for executing device management commands, the method comprising:
   providing an indication of a device management command queue;
   receiving, from a host of a memory system in response to providing the indication of the device management command queue, two or more device management commands and respective command types for each of the device management commands, wherein each of the two or more device management commands is a configuration request for configuring one or more channels of the memory system;
   determining a command execution order for the device management commands based on the command types corresponding to respective device management commands;
   queueing, in the device management command queue, the device management commands based on the command execution order;
   executing the device management commands queued in the device management command queue in the command execution order; and
   communicating, in response to a request from the host, the command execution indication responsive to executing the device management commands to the host.

2. The method of claim 1, wherein the respective command type of at least one of the device management commands includes a simple command type.

3. The method of claim 1, wherein the respective command type of at least one of the device management commands includes an ordered command type.

4. The method of claim 3, wherein determining the command execution order for the device management commands includes ordering all device management commands having the ordered command type to be executed after all previously queued device management commands and before all subsequently queued device management commands.

5. The method of claim 1, wherein the respective command type of at least one of the device management commands includes a head-of-queue command type.

6. The method of claim 5, wherein determining the command execution order for the device management commands includes ordering all device management commands having the head-of-queue command type to be executed before all previously queued device management commands.

7. The method of claim 1, wherein communicating, to the host, the command execution indication responsive to executing the device management commands includes communicating, to the host, the command execution indication after executing each of the device management commands.

8. The method of claim 1, wherein communicating, to the host, the command execution indication responsive to executing the device management commands includes communicating, to the host, the command execution indication after executing all of the device management commands.

9. A controller in communication with a memory array of a memory system, the controller comprising:
   a bus interface for communication with a host device; and
   a processor configured to:
      provide an indication of a device management command queue;
      receive, from the host device, two or more device management commands and a respective command type for each device management command, wherein each of the two or more device management commands is a configuration request for configuring one or more channels of the memory system;
      determine a command execution order for the two or more device management commands based on the command types corresponding to respective device management commands;
      queue, in the device management command queue, the two or more device management commands based on the command execution order;
      execute the two or more device management commands queued in the device management command queue in the command execution order; and
      communicate, to the host device, a command execution indication responsive to executing the two or more device management commands.

10. The controller of claim 9, wherein the respective command type of at least one of the two or more device management commands includes a simple command type.

11. The controller of claim 9, wherein the respective command type of at least one of the two or more device management commands includes an ordered command type.

12. The controller of claim 11, wherein the processor is further configured to determine the command execution order for the two or more device management commands based on the command types corresponding to respective device management commands by ordering all device management commands having the ordered command type to be executed after all previously queued device management commands and before all subsequently queued device management commands.

13. The controller of claim 9, wherein the respective command type of at least one of the two or more device management commands includes a head-of-queue command type.

14. The controller of claim 13, wherein the processor is further configured to determine the command execution order for the device management commands based on the command types corresponding to respective device management commands by ordering all device management commands having the head-of-queue command type to be executed before all previously queued device management commands.

15. The controller of claim 9, wherein the processor is further configured to communicate, to the host device, the command execution indication after executing each of the device management commands.

16. The controller of claim 9, wherein the processor is further configured to communicate, to the host device, the command execution indication after executing all of the device management commands.

17. A system for executing device management commands, the system comprising:
  a processor; and
  a memory coupled to the processor and including instructions that, when executed by the processor, cause the processor to:
    provide an indication of a device management command queue;
    receive, from an initiator device, two or more device management commands and corresponding command types corresponding to the two or more device management commands, wherein each of the two or more device management commands is a configuration request for configuring one or more channels of the memory system;
    determine a queue position for the two or more device management commands based on their respective command types corresponding to other device management commands in the device management command queue;
    queue, in the device management command queue, the two or more management commands in the determined queue positions;
    execute the two or more device management commands and the other device management commands in the device management command queue based on respective queue positions; and
    communicate, to the initiator device, a command execution indication responsive to executing the two or more device management commands.

18. The system of claim 17, wherein the command type corresponding to the at least one device management command includes a first command type, and wherein the queue position of the at least one device management command includes a position in the device management command queue immediately before or after any device management command of the other device management commands in the device management command queue having the first command type.

19. The system of claim 17, wherein the command type corresponding to the at least one device management command includes a second command type, and wherein the queue position of the at least one device management command includes a first available position in the device management command queue.

20. The system of claim 17, wherein the command type corresponding to the at least one device management command includes a third command type, and wherein the queue position of the at least one device management command includes a first position in the device management command queue.

* * * * *